United States Patent [19]

Moormann et al.

[11] Patent Number: 4,900,506

[45] Date of Patent: Feb. 13, 1990

[54] HIGH-TEMPERATURE REACTOR

[75] Inventors: Rainer Moormann; Klaus Hilpert; Karl Verfondern, all of Jülich, Fed. Rep. of Germany

[73] Assignee: Kernforschungsanlage Juelich GmbH, Juelich, Fed. Rep. of Germany

[21] Appl. No.: 129,179

[22] Filed: Dec. 7, 1987

[30] Foreign Application Priority Data

Dec. 9, 1986 [DE] Fed. Rep. of Germany ....... 3641993

[51] Int. Cl.⁴ .................... G21C 9/00; G21C 19/30
[52] U.S. Cl. ................................. 376/314; 376/313
[58] Field of Search ............................. 376/313, 314

[56] References Cited

U.S. PATENT DOCUMENTS

| | | | |
|---|---|---|---|
| 3,275,522 | 9/1966 | Kinsey et al. | 376/313 |
| 4,004,971 | 1/1977 | Freck et al. | 376/313 |
| 4,265,707 | 5/1981 | Schwarzer | 376/313 |
| 4,587,083 | 5/1986 | Colburn | 376/313 |

FOREIGN PATENT DOCUMENTS

| | | | |
|---|---|---|---|
| 2508350 | 9/1975 | Fed. Rep. of Germany | 376/314 |
| 2655310 | 6/1978 | Fed. Rep. of Germany . | |
| 3429579 | 2/1985 | Fed. Rep. of Germany . | |
| 51397 | 5/1978 | Japan | 376/313 |
| 1438525 | 7/1976 | United Kingdom . | |

OTHER PUBLICATIONS

E. Romberg et al, Coolant Purification and Coolant Chemistry for the "Dragon" High Temperature Gas Cooled Reactor, 1965, pp. 539–544, Atompraxis.

N. Wiberg, Lehrbuch der Anorganischen Chemie, 1985, pp. 700–713.

Thexton, Materials Research in AECL, pp. 15–18, Aug. 1975.

*Primary Examiner*—Deborah L. Kyle
*Assistant Examiner*—Richard W. Wendtland
*Attorney, Agent, or Firm*—Shlesinger & Myers

[57] ABSTRACT

A high-temperature reactor with a reactor core containing fuel elements crossed by a cooling gas circuit comprises a malfunction filter for filtering metal fission products discharged from the fuel elements in the event of core overheating. The filter is mounted in the cooling gas circuit outside the reactor core and consists of a carbon which is incompletely graphitized, or is not graphitized at all.

12 Claims, No Drawings

HIGH-TEMPERATURE REACTOR

The invention concerns a high-temperature reactor with a reactor core containing fuel elements and crossed by a cooling-gas circuit.

In high-temperature reactors, the so-called core overheating malfunctions are the predominant malfunction danger. These core overheating malfunctions are characterized by long-lasting failure of all present active equipment for cooling the core. Because of the post-disintegration heat, the reactor core then rises over a time of from 5 to 20 hours to temperatures in certain areas at which the nuclear fission products in the fuel particles no longer are held back extensively. After leaving the fuel particles, the fission products diffuse through the surrounding graphite layers of the spherical or block-shaped fuel elements and arrive at the cooling-gas region, where they are transported by the natural convection motion of the cooling gas into the upper regions of the reactor core. The metallic fission products cesium, rubidium, strontium, barium and, to a slight degree, also silver can be retained in part by absorption at the graphite of the colder fuel elements and also at the ceiling reflector, or their discharge from the reactor core may be delayed thereby.

In the instances of dangerous core overheatings, the primary circuit pressure exceeds the response pressure of the safety valves which are present. Because it must be assumed highly likely that these safety valves shall fail in the open position, there results communication between the primary circuit of the reactor and the reactor protective housing, so that the above fission products may arrive in part into this housing. Moreover, diverse mechanisms may result in the fission products being released into the environment in radiologically significant amounts.

Heretofore no apparatus was known to be designed or suitable to retain fission products in the core area in the event of core overheating.

The British patent 14 38 525 describes a cooling-gas filter for high-temperature reactors, which consists of a graphite body comprising through-holes. The purpose of this filter is to separate the metallic fission products accumulated during ordinary reactor operation, namely cesium 137, strontium 90 and silver 110, from the cooling gas, so that the heat exchangers mounted in the cooling-gas circuit, as well as other components outside the reactor core, are unexposed to these fission products, and so that their repair and inspection will be made easier. For this gas-cooling filter to be effective, it must inevitably be mounted in the area of the bottom-side cooling-gas exhaust of the reactor core, also as a replacement for reflector walls located there, whereby this filter is exposed to high temperatures. Filter operation is said to be especially effective at those temperatures.

In accordance with its rating as a cooling gas filter for normal operation, its capacity is designed so that less than half the cesium accumulation expected over 30 years shall be filtered. To retain fission products during core overheating, such a cooling-gas filter would be much too small and therefore practically ineffective. This is even more the case because graphite is little suited to retain metal fission products such as cesium and strontium, and the design of the previously known cooling-gas filter as a malfunction filter would entail practically impossible sizes.

The object of the invention is to create an effective apparatus to retain metal fission product isotopes, in particular those of cesium and strontium, in the core region of high-temperature reactors.

This problem is solved by the invention in that a malfunction filter is provided to filter the metal fission products discharging from the fuel elements in the event of core overheating, which filter is mounted in the cooling circuit outside the reactor core, preferably in the cold-gas region of the cooling-gas circuit, and consists at least partly of a carbon which is not graphitized and/or only incompletely graphitized.

This solution is based on the concept, which is already part of this invention, to prevent the substantial amounts of metal fission products released during core overheating from leaving the core region by means of an absorbing malfunction filter which retains these fission products. This requires that the filter be made of the material of the invention and be mounted in the manner of the invention. Contrary to graphite, a carbon which is incompletely graphitized or not at all is highly efficient for the metal fission products, in particular the isotopes of cesium and strontium, whereby, even though its capacity matched to the overheating conditions, the filter evinces admissible dimensions, i.e., it fits into the overall design of a high-temperature reactor. The amorphous carbon structure important to the filtering efficiency remains unchanged by the filter being assembled outside the reactor core as regards the high flux of fast neutrons within the reactor core, i.e., no after-graphitization, degrading the filter efficiency and therefore undesired, takes place. Accordingly the malfunction filter of the invention for the first time, represents an apparatus whereby the discharge of metal fission products from the core region can be prevented or at least substantially reduced in the event of core overheating.

Obviously, the content in incompletely graphitized carbon, or carbon which is not graphitized at all, shall be as high as possible because the efficiency of the malfunction filter of the invention depends decisively on that content. This content should be at least 5%, preferably 10%, by weight or more.

Among the suitable carbon materials for the malfunction filter of the invention, there are most of all carbonaceous binders which, following temperature treatment, were converted into secondary coke, but which were not graphitized. Illustratively such binders are pitch, tar and synthetic resins which, following heat treatment at about 1000° C., also can be called binder cokes. The use of binder coke for the malfunction filter of the invention is advantageous because erosion-caused abrasions and hence dust production are prevented.

The above described binder coke is present in relatively high contents and in the desired incompletely graphitized form, or entirely ungraphitized, in the so-called matrix graphite that is used in the manufacture of spherical fuel elements for high-temperature reactors. Accordingly, this so-called matrix graphite is especially suitable for the malfunction filter of the invention, especially in its A3-3 modified form, because it has a high absorptivity relative to the above fission products on account of its approximate content of 10% of binder coke. Furthermore, this matrix graphite also meets the other requirements essential for the use of a malfunction filter in which it is included, namely purity and adequate strength.

The malfunction filter should be mounted above the ceiling reflector to ensure that it will be crossed by natural convection in the event of malfunction. It may rest on the ceiling reflector.

The malfunction filter of the invention may assume the shape of a circular slab with a plurality of bore-holes, the total cross-section of the bore-holes to be selected in such a manner that no significant pressure drop is caused thereby in the cooling gas circuit. Therefore, the total porosity shall be at least 30%. The circular slab may be about 1 mm thick.

However, the malfunction filter of the invention also may be in the form of spheres in bulk, and the height being also about 1 m. A total porosity of 40% is desired.

Advantageous conditions are present for the malfunction filter of the invention especially when the malfunction filter is located in the cold gas region of the cooling gas circuit. Thereby, the malfunction filter is reliably prevented from reaching temperatures—during core overheating—at which desorption of the fission products cesium and strontium would take place, that is, when temperatures of 1,100° C. are exceeded. If the cold gas region however is outside the ceiling reflector area, that is, if the cooling gas does not flow from top to bottom through the reactor, the malfunction filter still should be preferably mounted above the ceiling reflector so that, in the event of malfunction, it should indeed be crossed by natural convection. This is because the maximum temperatures in the designs with upward or downward flows, as a rule, do not differ critically, with the ceiling reflector region rapidly heating up during overheating if designed for normal downward flow operation.

EXAMPLE 1

A 1 meter high circular slab with 2 cm diameter vertical bores and a total porosity of 30% is mounted on the ceiling reflector of a high-temperature reactor. The circular plate consists of A3-3 matrix graphite. Using this assembly, it is possible to lower the release of cesium in the primary circuit in the danger-determining core overheating cases in the HTR-500 (categories K1-K3, see Juel. Spez.-220 [1983]) by two orders of magnitude over the prior HTR-500 design, and as regards strontium, by one order of magnitude and more. Both values are for a time of 200 h following the onset of malfunction. They were determined using the malfunction computer program FRESCO, described by H. Krohn, Juel.-1791 (1982) and by H. Krohn, R. Finken, Juel-Spez-212 (1983). The contribution of cesium release in these categories of malfunctions to the total danger (collective danger by delayed damage) of the HTR-500 is about 85%, the corresponding amount of strontium is 5 to 10%. Accordingly, substantial reduction of the total danger of the reactor plant, namely an order of magnitude, may be expected.

To further improve the retention of the fission products, the graphitization degree of the binder coke in the A3-3 matrix graphite can be lowered by dropping the temperature in the graphitization process from 1950° to 1600° C. An increase in binder coke in the matrix graphite acts similarly.

EXAMPLE 2

Balls of A3-3 matrix graphite are deposited in a 1 m high bulk and with an average porosity of 40% on the ceiling reflector of a high-temperature reactor. These balls correspond to the fuel elements used for the ball high-temperature reactor but lack any fuel particles. The release of fission products into the primary circuit drops by a similar order to magnitude as in Example 1 for cesium and strontium.

We claim:

1. A malfunction filter for a high temperature reactor having a ceiling reflector and a reactor core containing fuel elements crossed by a cooling gas circuit, the filter comprising:
   (a) a filtering element for metal fission products emitted by the fuel elements during a reactor core heating malfunction;
   (b) said filtering element for being disposed above the ceiling reflector; and,
   (c) said filtering element comprising binder coke comprised of carbon which is incompletely graphitized or at least 5% non-graphitized.

2. High-temperature reactor defined in claim 1, characterized in that the carbon is matrix graphite.

3. High-temperature reactor defined in claim 1, characterized in that the malfunction filter rests on the ceiling reflector.

4. High-temperature reactor defined in claim 1, characterized in that the malfunction filter assumes the shape of a slab provided with a plurality of boreholes.

5. High-temperature reactor defined in claim 4, characterized in that the slab has a total porosity of at least 30%.

6. High-temperature reactor defined by claim 4, characterized in that the slab is circular and about 1 meter thick.

7. High-temperature reactor defined in claim 1, characterized in that the malfunction filter is a pile of balls.

8. High-temperature reactor defined in claim 7, characterized in that the pile of balls is about 1 meter high.

9. High-temperature reactor defined in claim 7, characterized in that the pile of balls evinces a total porosity of 40%.

10. High-temperature reactor defined in claim 1, characterized in that the malfunction filter is mounted in the cold-gas region of the cooling-gas circuit.

11. High-temperature reactor defined by claim 5, characterized in that the slab is circular and approximately 1 meter thick.

12. High-temperature reactor defined in claim 8, characterized in that the pile of balls evinces a total porosity of 40%.

* * * * *